United States Patent
Niwamae

(10) Patent No.: US 7,891,890 B2
(45) Date of Patent: Feb. 22, 2011

(54) SHUTTER DEVICE AND IMAGE PICKUP APPARATUS INCLUDING THE SAME

(75) Inventor: Yuuki Niwamae, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 12/404,209

(22) Filed: Mar. 13, 2009

(65) Prior Publication Data

US 2009/0238554 A1    Sep. 24, 2009

(30) Foreign Application Priority Data

Mar. 19, 2008   (JP) ............................. 2008-071598

(51) Int. Cl.
  *G03B 9/40*   (2006.01)
  *G03B 9/10*   (2006.01)
  *H04N 5/238*  (2006.01)

(52) U.S. Cl. ....................... 396/484; 396/486; 396/493; 348/368

(58) Field of Classification Search ................. 396/484, 396/483, 486, 487, 488, 493; 348/368
See application file for complete search history.

(56) References Cited

U.S. PATENT DOCUMENTS

| 5,734,940 A | 3/1998 | Iwane |
| 2006/0078330 A1* | 4/2006 | Noto et al. ................... 396/452 |

FOREIGN PATENT DOCUMENTS

| JP | 8-220589 A | 8/1996 |
| JP | 2006-227186 A | 8/2006 |

* cited by examiner

*Primary Examiner*—Rochelle-Ann J Blackman
(74) *Attorney, Agent, or Firm*—Canon U.S.A., Inc. I.P. Division

(57) ABSTRACT

A shutter device includes first and second shutter blades, a shutter base plate rotatably supporting the first and second shutter blades, a partition plate arranged between the first and second shutter blades supported by the shutter base plate, and a cover plate fixed to the shutter base plate while the first and second shutter blades are supported by the shutter base plate and the partition plate is arranged between the first and second shutter blades. The first and second shutter blades, the partition plate, and the cover plate have conductivity. The cover plate is electrically connected to the partition plate. The cover plate has a potential at a ground level.

6 Claims, 16 Drawing Sheets

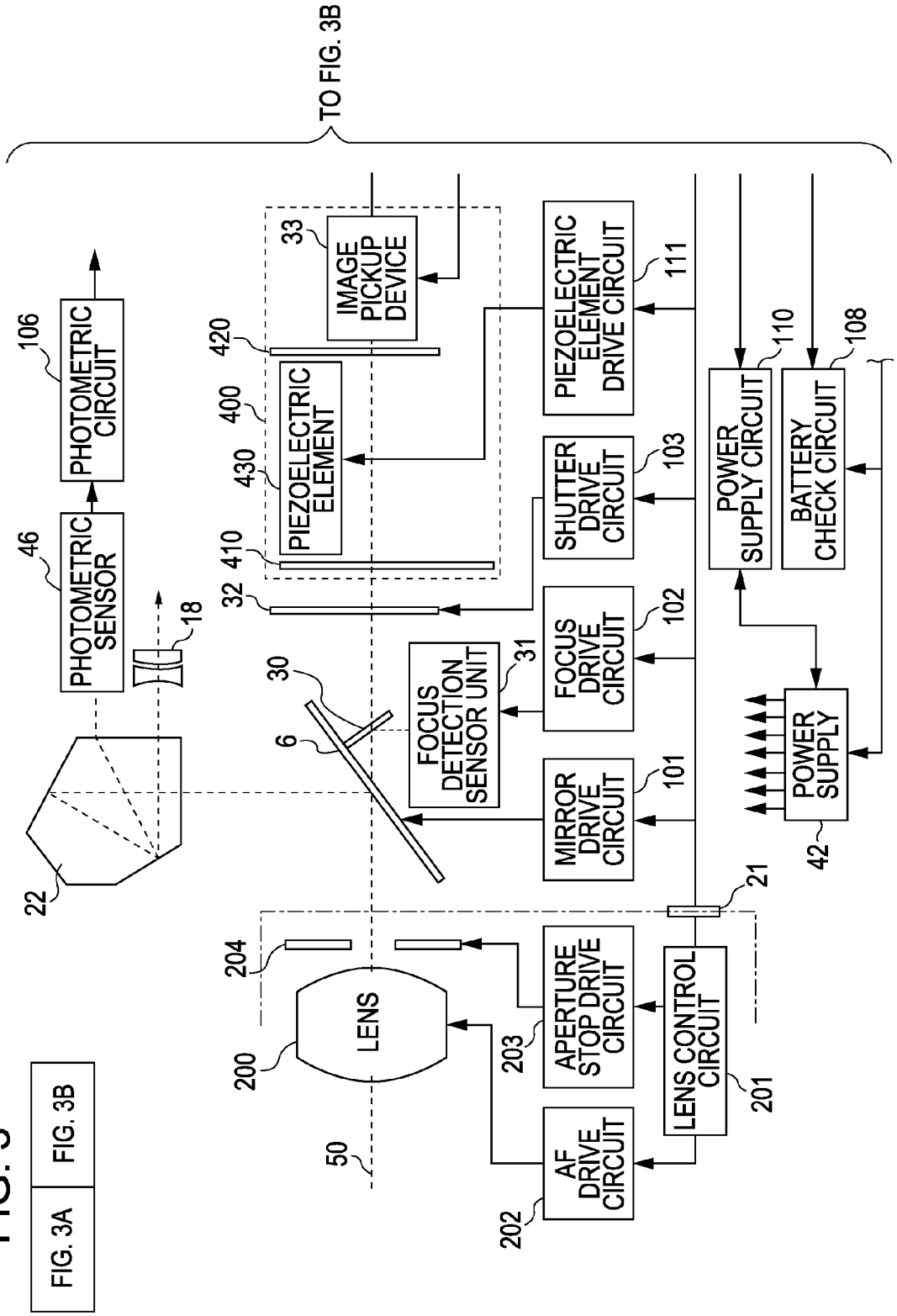

SHUTTER DEVICE AND IMAGE PICKUP APPARATUS INCLUDING THE SAME

BACKGROUND OF THE INVENTION

1. Field of the Invention

The present invention relates to a shutter device for an image pickup apparatus, and an image pickup apparatus, such as a digital still camera, including the shutter device and having a function of displaying an image captured by an image pickup device on an image display unit, such as a liquid crystal display panel.

2. Description of the Related Art

In an image pickup apparatus such as a digital still camera which performs image capturing by converting an image signal into an electric signal, an image pickup device, such as a CCD sensor or a CMOS sensor, receives an imaging light beam and outputs an photoelectrically converted signal. The signal is converted into image data, and the data is stored in a recording medium, such as a memory card.

As disclosed in Japanese Patent Laid-Open No. 8-220589, such an image pickup apparatus provides a plurality of image pickup sensitivity choices, such as ISO speed ratings of 100, 200, 400, 800, 1600, and 3200.

As the value becomes larger, the sensitivity becomes higher, and a correctly exposed image can be captured with a small quantity of light. Even at a higher shutter speed, a correctly exposed image can be captured.

For example, for image capturing in an environment with insufficient brightness, e.g., inside of a room, or outside of a room at night, a light quantity is increased by increasing the sensitivity, and a shutter speed is increased correspondingly. Thus, an image without blur can be captured.

However, as the sensitivity is increased, more noise components appear in an image. This may deteriorate the image quality.

In addition, particularly in a lens-interchangeable digital single-lens reflex camera, a focal-plane shutter is arranged near an image pickup device. Static electricity is charged by the operation of the focal-plane shutter, and a noise component is produced when the static electricity is discharged.

As a result, when the digital single-lens reflex camera performs image capturing, the image quality may be deteriorated not only by image capturing with an increased sensitivity, but also by the noise component produced by the operation of the focal-plane shutter.

Here, a configuration of the focal-plane shutter and a mechanism of charging of static electricity by the operation of the focal-plane shutter are described.

FIG. 10 is a front view showing a focal-plane shutter in a before-travel state according to related art. An aperture 501a is an opening which guides an imaging light beam onto a film or an image pickup device. A shutter base plate 501 has a first drive lever shaft 501b and a second drive lever shaft 501c. A first drive lever 502 is rotatably mounted to the first drive lever shaft 501b. A second drive lever 503 is rotatably mounted to the second drive lever shaft 501c. The first drive lever 502 and the second drive lever 503 are provided with torsion springs (not shown), and hence are urged clockwise. The first drive lever 502 transmits a torque to a first blade group 510 (described later) via a first drive pin 502a. The second drive lever 503 transmits a torque to a second blade group 520 (described later) via a second drive pin 503a. The first drive lever 502 and the second drive lever 503 complete their traveling when the first drive pin 502a and the second drive pin 503a contact semicircular rubber pieces 504 and 505.

FIG. 11 is an exploded perspective view showing the focal-plane shutter according to the related art when seen from the obliquely rear side of an opening portion. The second blade group 520, a partition plate 506, a buffer member 531, the first blade group 510, and a cover plate 507 are mounted to the shutter base plate 501 in that order. The partition plate 506 divides a space into a traveling space of the first blade group 510 and a traveling space of the second blade group 520. Also, the partition plate 506 is obliquely arranged with respect to the shutter base plate 501 and the cover plate 507 so as to provide superposing spaces for the first blade group 510 and the second blade group 520. The cover plate 507 has hook insertion holes 507a and 507b which slide along hooks 501h and 501i of the shutter base plate 501, thereby being inhibited into moving in an optical-axis direction. The cover plate 507 is fastened to the shutter base plate 501 by cover plate fastening screws 508 and 509.

FIG. 12 is a rear view showing the focal-plane shutter before traveling according to the related art. FIG. 13 is a rear view showing the focal-plane shutter when traveling of the first blade group 510 is completed according to the related art. FIG. 14 is a rear view showing the focal-plane shutter when traveling of the second blade group 520 is completed according to the related art. For easier understanding, the partition plate 506 and the cover plate 507 are not illustrated.

The first blade group 510 is rotatably mounted to a first main-arm shaft 501d. The first blade group 510 includes a first main-arm 511, a first sub-arm 512, and four first blades 513, 514, 515, and 516.

The first main-arm 511 is fitted to the first drive pin 502a. The first sub-arm 512 is rotatably mounted to a first sub-arm shaft 501e. The four first blades 513, 514, 515, and 516 are rotatably mounted to the first main-arm 511 and the first sub-arm 512 by blade caulking dowels 517.

Similarly, the second blade group 520 is rotatably mounted to a second main-arm shaft 501f. The second blade group 520 includes a second main-arm 521, a second sub-arm 522, and four second blades 523, 524, 525, and 526.

The second main-arm 521 is fitted to the second drive pin 503a. The second sub-arm 522 is rotatably mounted to a second sub-arm shaft 501g.

The four second blades 523, 524, 525, and 526 are rotatably mounted to the second main-arm 521 and the second sub-arm 522 by blade caulking dowels 517.

When the first drive lever 502 is rotated by the torsion spring (not shown), the first blade group 510 travels from a deployed state in FIG. 12, in which the aperture 501a is closed, to a superposed state in FIG. 13, in which the aperture 501a is open. The buffer member 531 is made of rubber or the like. When traveling of the first blade group 510 is completed, the first blades 513, 514, 515, and 516 contact the buffer member 531.

When the second drive lever 503 is driven, the second blade group 520 travels from a superposed state in FIG. 13, in which the aperture 501a is open, to a deployed state in FIG. 14, in which the aperture 501a is closed. Hence, the aperture 501a is covered.

FIGS. 15A to 15D are conceptual diagrams showing a mechanism in which static electricity is charged due to the operation of the focal-plane shutter of the related art.

FIG. 15A illustrates a before-travel state of the focal-plane shutter. At this time, the first blade group 510, the partition plate 506, and the cover plate 507 are not moved. Hence, static electricity is not charged.

FIG. 15B illustrates a traveling state of the first blade group 510. At this time, the first blade group 510, the partition plate 506, and the cover plate 507 are charged with static electricity because of friction among the first blade group 510, the partition plate 506, and the cover plate 507.

FIG. 15C illustrates a travel completed state of the first blade group 510. At this time, the first blade group 510 contacts the buffer member 531 (illustrated in FIGS. 12 to 14), and hence the first blade group 510 is largely vibrated in a traveling direction and a direction orthogonal thereto. Owing to this, contact charging and separation charging occur between the first blade group 510 and the partition plate 506, and between the first blade group 510 and the cover plate 507.

In particular, the vibration of the first blade group 510 causes the partition plate 506 to be vibrated, and hence, contact charging and separation charging also occur between the partition plate 506 and the cover plate 507, and between the partition plate 506 and the shutter base plate 501. Accordingly, the first blade group 510, the partition plate 506, and the cover plate 507 are charged with static electricity. Similarly, the second blade group 520 is charged with static electricity because of triboelectric charging occurring among the four blades 523 to 526 of the second blade group 520, between the second blade group 520 and the partition plate 506, and between the second blade group 520 and the shutter base plate 501, in the traveling state and in the travel completed state.

FIG. 15D illustrates a deployed state of the first blade group 510 after traveling is completed. At this time, if the first blade group 510 and any of the partition plate 506, the cover plate 507, and the second blade group 520 are charged with static electricity, a potential difference is produced, and discharging occurs due to the potential difference.

In particular, discharging likely occurs when a distance between the first blade 513, which closes the aperture 501a first among the first blade group 510, and any of the partition plate 506, the cover plate 507, and the second blade group 520 becomes a predetermined distance that causes discharging to occur.

The state shown in FIG. 15D is in the middle of a process in which the image pickup device reads accumulated charges. Hence, a noise component produced by discharging may adversely affect an image.

In light of the circumstances, Japanese Patent Laid-Open No. 2006-114989 discloses that a conductive shutter blade is configured to have a potential at the ground level by using a conductive cover plate which contacts the shutter blade, thereby preventing a focal-plane shutter from being charged.

Also, Japanese Patent Laid-Open No. 2006-227186 discloses that a shutter base plate and a cover plate are formed of a conductive material and electrically connected to the ground.

However, when the shutter blade is configured to have the potential at the ground level by using the cover plate which contacts the shutter blade like the shutter device disclosed in Japanese Patent Laid-Open No. 2006-114989, a partition plate may be vibrated as shown in FIG. 15C. Thus, contact charging and separation charging occur at the shutter base plate, and the partition plate is charged with static electricity.

In addition, as disclosed in Japanese Patent Laid-Open No. 2006-227186, when the shutter base plate and the cover plate are electrically connected to the ground, referring to FIGS. 15B and 15C, triboelectric charging, contact charging, and separation charging occur at the partition plate and the shutter blade, and the partition plate and the shutter blade are charged with static electricity.

SUMMARY OF THE INVENTION

An aspect of the present invention is a shutter device including first and second shutter blades, a shutter base plate rotatably supporting the first and second shutter blades, a partition plate arranged between the first and second shutter blades supported by the shutter base plate, and a cover plate fixed to the shutter base plate while the first and second shutter blades are supported by the shutter base plate and the partition plate is arranged between the first and second shutter blades. The first and second shutter blades, the partition plate, and the cover plate have conductivity. The cover plate is electrically connected to the partition plate. The cover plate has a potential at a ground level.

Further features of the present invention will become apparent from the following description of exemplary embodiments with reference to the attached drawings.

BRIEF DESCRIPTION OF THE DRAWINGS

FIGS. 3A and 3B are a block diagram showing a main electrical configuration of the digital single-lens reflex camera according to the embodiment of the present invention.

DESCRIPTION OF THE EMBODIMENTS

Hereinafter, various embodiments and features for implementing the present invention are described below with reference to the accompanying drawings.

Figure 1:
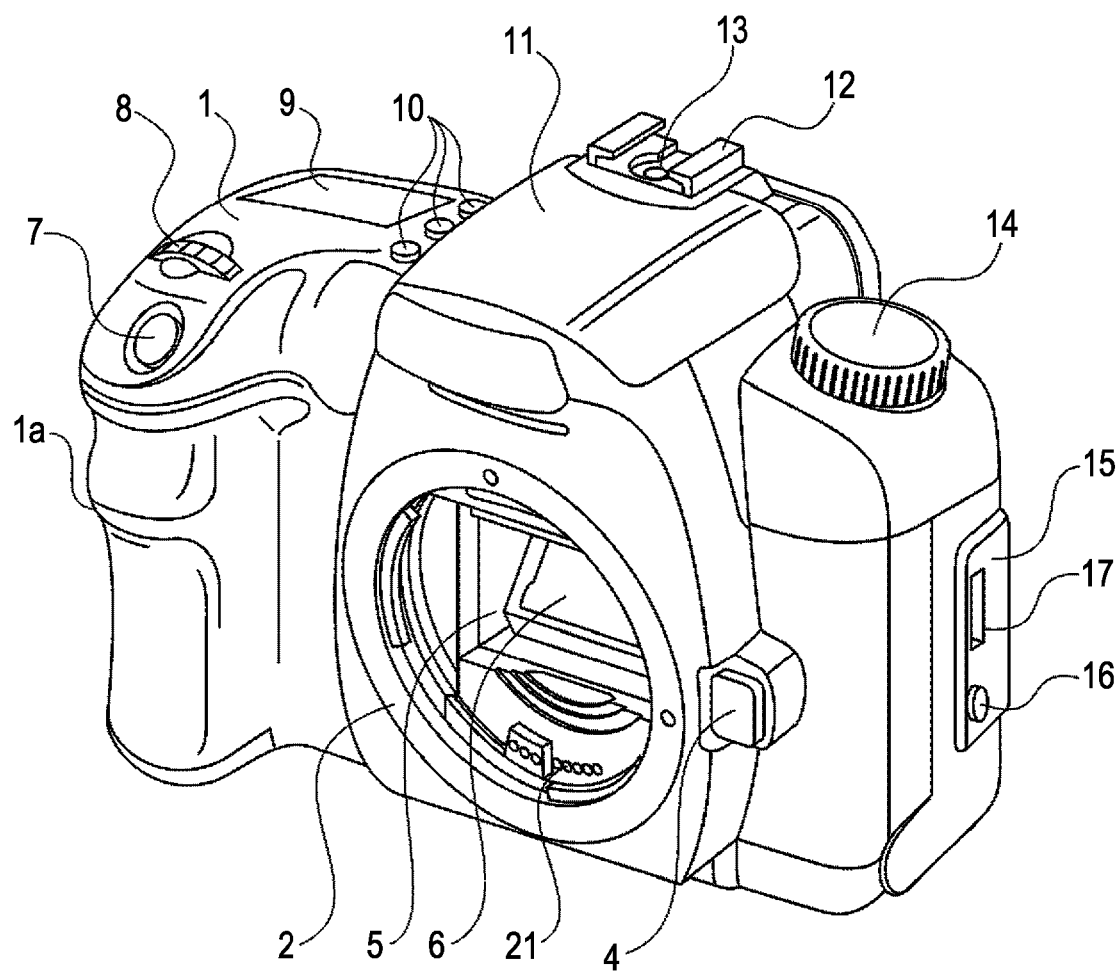
FIG. 1 is a perspective view showing the front side of a digital single-lens reflex camera with a lens unit detached according to an embodiment of the present invention.
Figure 2:
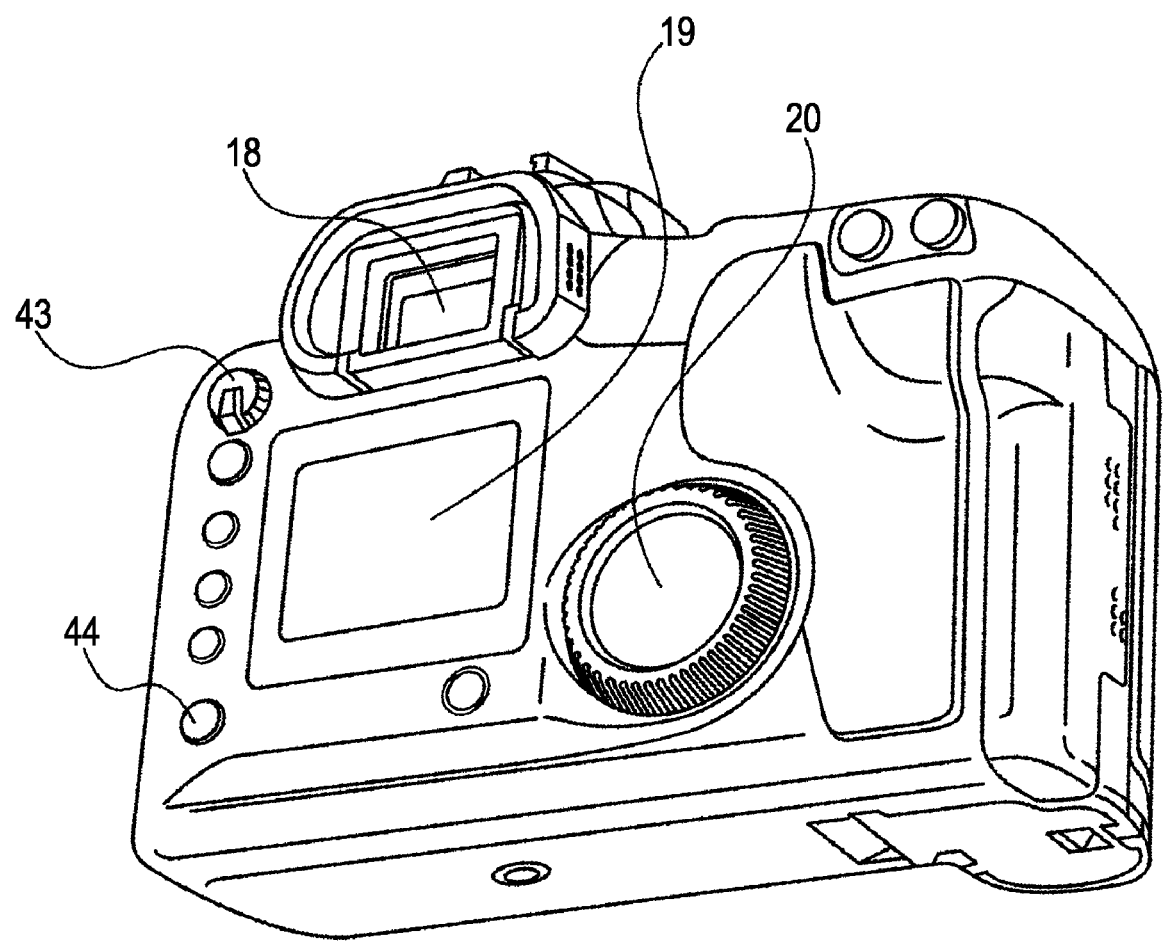
FIG. 2 is a perspective view showing the rear side of the digital single-lens reflex camera according to the embodiment of the present invention.

FIGS. 1 and 2 illustrate the appearance of a digital single-lens reflex camera according to this embodiment. In particular, FIG. 1 is a perspective view showing the front side of the digital single-lens reflex camera with a lens unit detached, and FIG. 2 is a perspective view showing the rear side of the digital single-lens reflex camera.

Referring to FIG. 1, a camera body 1 has a grip 1a protruding toward the front side so that a user can firmly grip the camera during shooting. A mount portion 2 allows a detachable lens unit (not shown) to be fixed to the camera body 1. A mount contact 21 allows a control signal, a state signal, a data signal, etc. to be transmitted between the camera body 1 and the lens unit. Also, the mount contact 21 allows power to be supplied to the lens unit. In addition to the electric communication, the mount contact 21 may provide optical communication, audio communication, or the like.

A lens lock release button 4 is pressed to detach the lens unit. A mirror box 5 is arranged inside a camera casing. An imaging light beam passing through a lens is guided to the mirror box 5. A main-mirror 6 is arranged in the mirror box 5. The main-mirror 6 may be held at 45 degrees with respect to an imaging optical axis so as to guide an imaging light beam toward a pentaprism 22 (see FIG. 3), and may be held at a position retracted from the imaging light beam so as to guide the imaging light beam toward an image pickup device 33 (see FIG. 3).

A shutter release button 7, a main-operation dial 8, and a top panel operation mode setting button 10 are arranged in an area near the grip 1a at the top of the camera. The shutter release button 7 serves as an activation switch to start image capturing. The main-operation dial 8 sets a shutter speed and a lens aperture value in accordance with an operation mode during image capturing. The top panel operation mode setting button 10 provides setting for a photographic system. The operation results using these operation members are partly displayed on an external LCD device 9.

A first stroke of the shutter release button 7 turns ON a SW1 (7a, described later), and a second stroke of the shutter release button 7 turns ON a SW2 (7b, described later).

The top panel operation mode setting button 10 sets whether one-time pressing of the shutter release button 7 executes continuous shooting or single shooting, or selects self-timer shooting mode. The setting state is displayed on the external LCD device 9.

A stroboscopic unit 11, which pops up from the camera body 1, a shoe groove 12 for attachment of a flush, and a flash contact 13 are provided in a center area at the top of the camera. A photographing mode setting dial 14 is arranged in a right area at the top of the camera.

An openable/closable external terminal panel 15 is provided at a side surface of the camera opposite to the grip 1a. A video signal output jack 16 and a USB output connector 17 are arranged under the external terminal panel 15.

Referring to FIG. 2, a viewfinder eyepiece window 18 is provided in an upper area of a rear surface of the camera. Also, a color liquid crystal monitor 19 configured to display an image is provided in a center area of the rear surface of the camera. A sub-operation dial 20 arranged near the color liquid crystal monitor 19 assists the function of the main-operation dial 8. For example, the sub-operation dial 20 is used to set an exposure correction amount for an optimum exposure value calculated by an automatic exposure device in an AE mode of the camera. Alternatively or additionally, the sub-operation dial 20 is used in a manual mode in which the user intentionally determines the shutter speed and the lens aperture value, such that the main-operation dial 8 sets the shutter speed whereas the sub-operation dial 20 sets the lens aperture value. Also, the sub-operation dial 20 is used to select a captured image to be displayed on the color liquid crystal monitor 19.

A main switch 43 activates or deactivates the operation of the camera.

A cleaning instruction operation member 44 actuates a cleaning mode (described later). When the cleaning instruction operation member 44 is operated, the cleaning mode is started, in which the user can directly clean up an infrared cut filter 410.

Figure 3B:
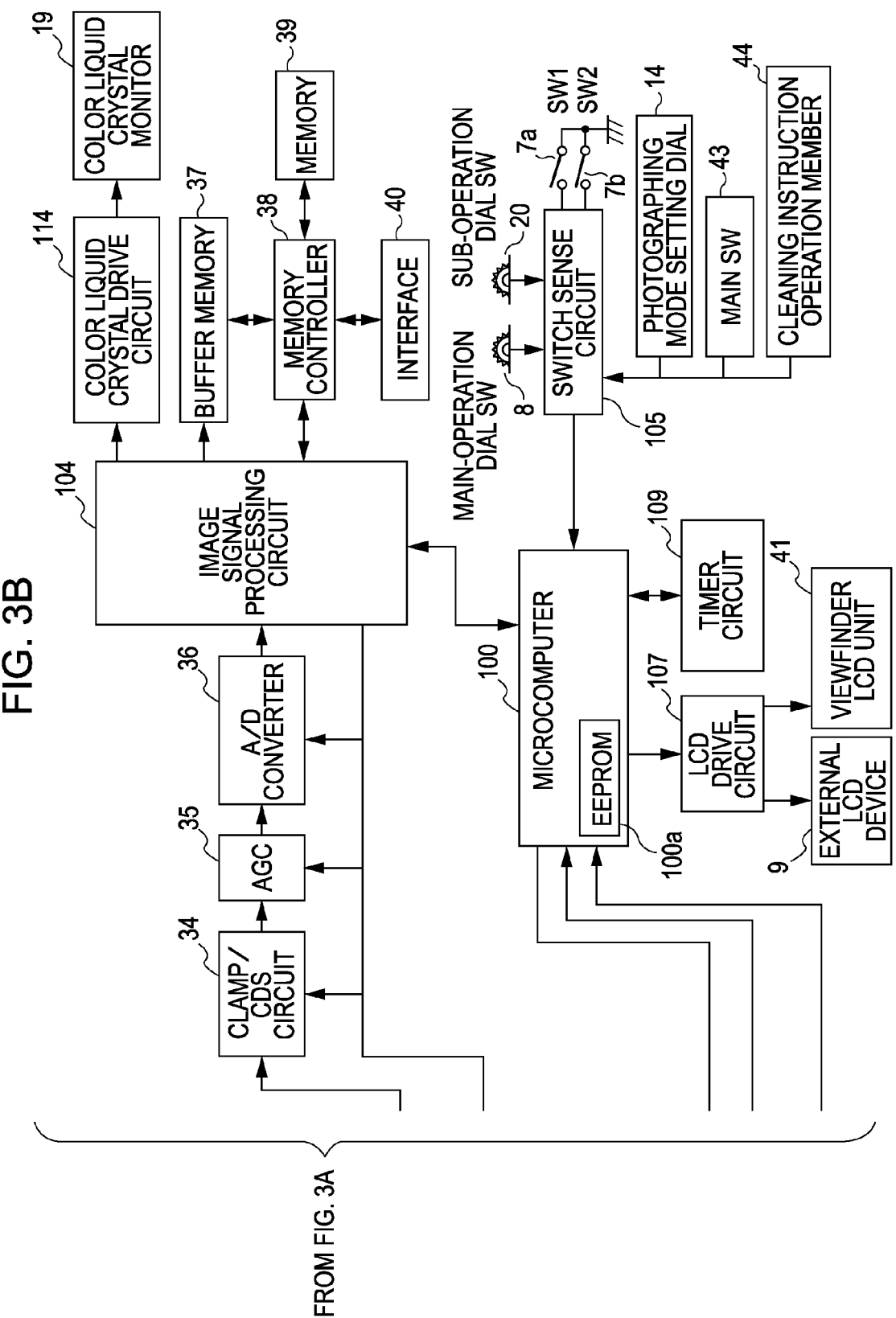

FIG. 3 is a block diagram showing a main electrical configuration of the digital single-lens reflex camera according to the embodiment of the present invention. Like numerals refer like components as in the figures described above.

Reference numeral 50 denotes an imaging optical axis.

A central processing unit (hereinafter, referred to as MPU) 100 of a microcomputer is arranged in the camera body 1. The MPU 100 controls the operation of the camera, and hence executes various processing and gives instructions to respective elements.

An EEPROM 100a is arranged in the MPU 100. The EEPROM 100a can store timer information of a timer circuit 109 and other information.

The MPU 100 is connected to a mirror drive circuit 101, a focus detection circuit 102, a shutter drive circuit 103, an image signal processing circuit 104, a switch sense circuit 105, a photometric circuit 106, an LCD drive circuit 107, a battery check circuit 108, a timer circuit 109, a power supply circuit 110, and a piezoelectric element drive circuit 111. These circuits are operated under the control of the MPU 100.

Also, the MPU 100 communicates with a lens control circuit 201 arranged in the lens unit via the mount contact 21. The mount contact 21 also has a function of transmitting a signal to the MPU 100 while the lens unit is connected to the mount contact 21. Accordingly, communication is made between the lens control circuit 201 and the MPU 100, and hence, a lens 200 and an aperture stop 204 in the lens unit can be driven using an AF drive circuit 202 and an aperture stop drive circuit 203.

It is to be noted that, while a single lens is illustrated in this embodiment, the lens 200 actually includes a plurality of lens units.

The AF drive circuit 202 comprises, for example, a stepping motor. The AF drive circuit 202 makes an adjustment so that the imaging light beam is focused on the image pickup device 33 by changing the position of a focus lens in the lens 200 under the control of the lens control circuit 201. The aperture stop drive circuit 203 comprises, for example, an automatic iris. The aperture stop drive circuit 203 changes the aperture stop 204 under the control of the lens control circuit 201, so that an optical aperture value is obtained.

The main-mirror 6 guides the imaging light beam passing through the lens 200 to the pentaprism 22, and partly transmits the imaging light beam to guide the light beam to a sub-mirror 30. The sub-mirror 30 guides the transmitted imaging light beam to a focus detection sensor unit 31.

The mirror drive circuit 101 drives the main-minor 6 to a position in which an object image can be observed through the viewfinder eyepiece window 18, and a position retracted from the imaging light beam. Simultaneously, the minor drive circuit 101 drives the sub-minor 30 to a position in which the imaging light beam is guided to the focus detection sensor unit 31, and a position retracted from the imaging light beam. In particular, the mirror drive circuit 101 comprises, for example, a DC motor and a gear train.

The focus detection sensor unit 31 employs a known phase contrast method, and includes a field lens, a reflection mirror, a secondary imaging lens, an aperture stop, and a line sensor with a plurality of CCDs, which are arranged near an image plane (not shown). The focus detection sensor unit 31 outputs a signal to the focus drive circuit 102. The focus drive circuit 102 converts the signal into an object image signal, and transmits the converted signal to the MPU 100. The MPU 100 performs a focus detection calculation by a phase contrast detection method on the basis of the object image signal. Then, a defocusing amount and a defocusing direction are obtained. On the basis of the data, the focus lens in the lens 200 is driven to an in-focus position by using the lens control circuit 201 and the AF drive circuit 202.

The pentaprism 22 is an optical member that reflects the imaging light beam, which has been reflected by the main-mirror 6, into an elect image. The user can observe an object image through the viewfinder eyepiece window 18 via a viewfinder optical system.

The pentaprism 22 also partly guides the imaging light beam to a photometric sensor 46. The photometric circuit 106 receives the output from the photometric sensor 46. The photometric circuit 106 converts the received output into brightness signals for respective areas in a view plane, and outputs the brightness signals to the MPU 100. The MPU 100 calculates exposure values from the obtained brightness signals.

A focal-plane shutter unit 32 includes a shutter base plate 301, a first blade group 310, and a second blade group 320. The focal-plane shutter unit 32 inhibits an imaging light beam from passing therethrough while the user observes an object image through the viewfinder eyepiece window 18. The focal-plane shutter unit 32 is arranged at a position slightly distant from the infrared cut filter 410 (described later). The focal-plane shutter unit 32 is configured to obtain a desired exposure time from a difference between a traveling time of the first blade group 310 and a traveling time of the second blade group 320 in accordance with a release signal when an image is shot. The focal-plane shutter unit 32 is controlled by the shutter drive circuit 103, which receives an instruction from the MPU 100.

The image pickup device 33 employs a CMOS sensor. The image pickup device may by any of various types, such as CCD type, CMOS type, and CID type.

A clamp/CDS (correlative double sampling) circuit 34 performs basic analogue processing prior to A/D conversion. Also, the clamp/CDS circuit 34 can change the clamp level. An AGC (automatic gain control device) 35 performs basic analogue processing prior to A/D conversion. Also, the AGC circuit 35 can change the AGC reference level. An A/D converter 36 converts an analogue output signal from the image pickup device 33 into a digital signal.

The infrared cut filter 410 is rectangular and eliminates a high spatial frequency. To prevent foreign substances from adhering on the infrared cut filter 410, conductive coating is applied to the surface of the infrared cut filter 410.

An optical low pass filter 420 is arranged such that a plurality of birefringent plates and a plurality of phase plates, both made of crystal, are stacked and bonded. The optical low pass filter 420 divides a light beam incident on the image pickup device 33 into a plurality of sub-beams, thereby efficiently reducing spurious resolution signals and false color signals.

A piezoelectric element drive circuit 111 vibrates a piezoelectric element 430 which is fixed to the infrared cut filter 410. The piezoelectric element drive circuit 111 vibrates the piezoelectric element 430 under the instruction from the MPU 100 so that the amplitude of the vibration of the infrared cut filter 410 becomes a predetermined value.

An image pickup unit 400 includes the infrared cut filter 410, the piezoelectric element 430, and the image pickup device 33.

The image signal processing circuit 104 executes general image processing for digitalized image data with hardware, such processing including gamma knee processing, filtering processing, and information synthesis processing for monitor displaying. The image data for monitor displaying from the image signal processing circuit 104 is displayed on the color liquid crystal monitor 19 via the color liquid crystal drive circuit 114.

Also, the image signal processing circuit 104 may store the image data in a buffer memory 37 via a memory controller 38 under the instruction from the MPU 100. Further, the image signal processing circuit 104 has a function of performing image data compression processing, such as JPEG. When shooting is continuously performed, such as a continuous shooting operation, image data may be temporarily stored in the buffer memory 37, and unprocessed image data may be sequentially read through the memory controller 38. Accordingly, the image signal processing circuit 104 can sequentially perform image processing and compression processing irrespective of the speed of transmission of the image data input from the A/D converter 36.

The memory controller 38 causes image data input from an external interface 40 (corresponding to the video signal output jack 16 and the USB output connector 17 in FIG. 1) to be stored in a memory 39. Also, the memory controller 38 causes image data stored in the memory 39 to be output from the external interface 40. The memory 39 is, for example, a flash memory detachably attached to the camera body 1.

Upon an operation by the user, the cleaning instruction operation member 44 receives an instruction to start the cleaning mode, and brings the camera body 1 into the cleaning mode.

The power supply circuit 110 supplies necessary power for the cleaning mode to respective portions of the camera body 1. Simultaneously, the power supply circuit 110 detects a remaining battery level of a power supply 42, and transmits the result to the MPU 100. When the MPU 100 receives the signal to start the cleaning mode, the MPU 100 drives the main-mirror 6 to the position retracted from an imaging light beam, and also drives the sub-mirror 30 to the position retracted from an imaging light beam via the mirror drive circuit 101. Further, the MPU 100 drives the focal-plane shutter unit 32 to the position retracted from the imaging light beam via the shutter drive circuit 103. In the cleaning mode, the user can directly remove foreign substances on the infrared cut filter 410 for cleaning by using, for example, a cotton swab, Silbon paper, or rubber.

The switch sense circuit 105 transmits input signals to the MPU 100 in accordance with the operation states of the switches. A switch SW1 7a is turned ON by a first stroke of the shutter release button 7. A switch SW2 7b is turned ON by a second stroke of the shutter release button 7. When the switch SW2 7b is turned ON, a shooting start instruction is transmitted to the MPU 100. The switch sense circuit 105 is also connected to the main-operation dial 8, the sub-operation dial 20, the photographing mode setting dial 14, the main switch 43, and the cleaning instruction operation member 44.

The LCD drive circuit 107 drives the external LCD device 9 and a viewfinder LCD unit 41 under the instruction from the MPU 100.

The battery check circuit 108 checks a battery at a predetermined time interval in accordance with the signal from the MPU 100, and transmits the detection output to the MPU 100. The power supply 42 supplies necessary power to respective elements of the camera.

The timer circuit 109 counts time and date in a period from an OFF operation to a next ON operation of the main switch 43, and transmits the count result to the MPU 100.

Next, the focal-plane shutter unit of this embodiment is described with reference to FIGS. 4 to 9. Similar parts to those of the related art have similar numerals in tens place and ones place.

Figure 4:
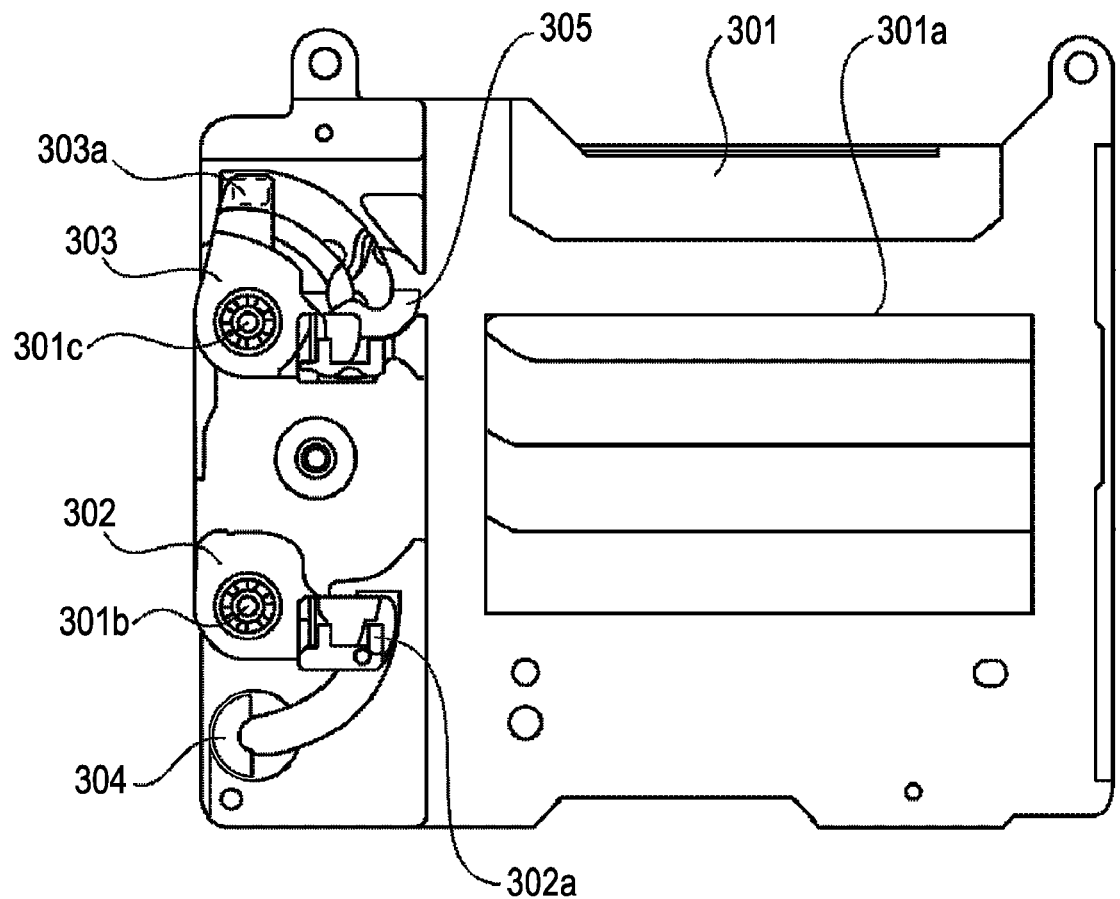
FIG. 4 is a front view showing a focal-plane shutter unit according to the embodiment of the present invention.

FIG. 4 is a front view showing the focal-plane shutter unit 32 according to the embodiment of the present invention.

Figure 5:
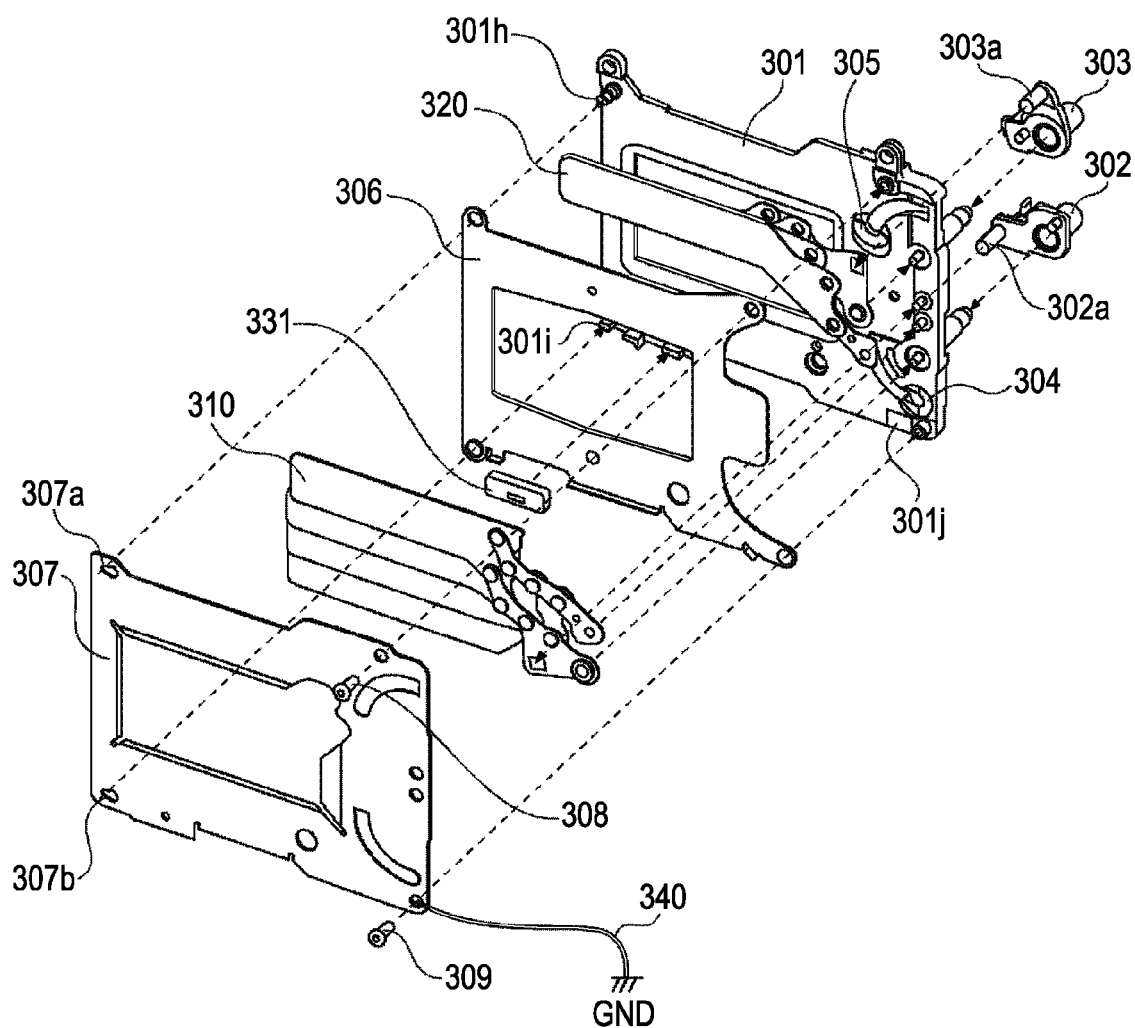
FIG. 5 is an exploded perspective view showing the focal-plane shutter unit according to the embodiment of the present invention when seen from the obliquely rear side of an opening portion.

FIG. 5 is an exploded perspective view showing the focal-plane shutter unit 32 according to the embodiment of the present invention when seen from the obliquely rear side of an opening portion.

Figure 6:
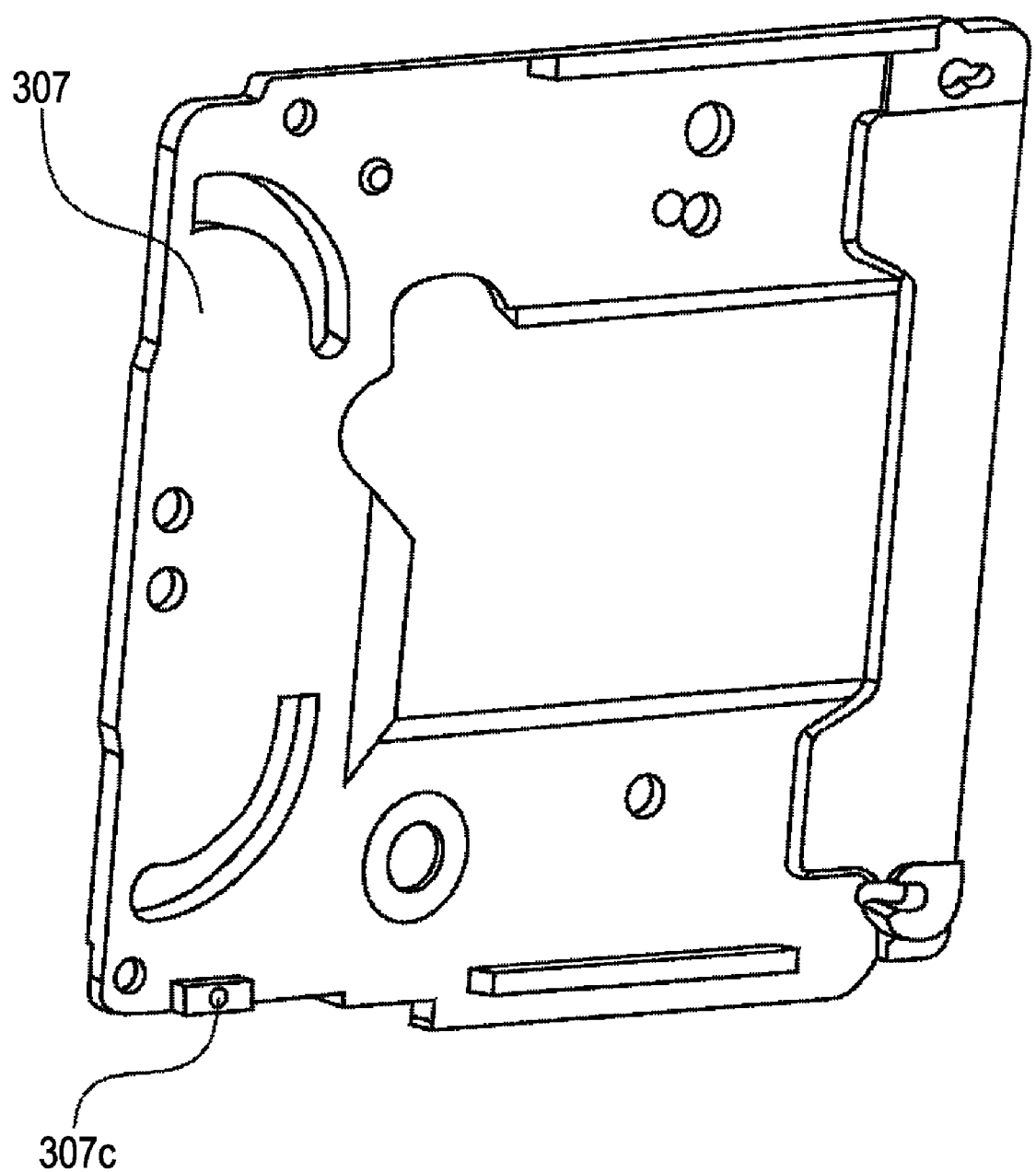
FIG. 6 is a perspective view showing a cover plate according to the embodiment of the present invention.

FIG. 6 is a perspective view showing a cover plate 307 according to the embodiment of the present invention.

Figure 7:
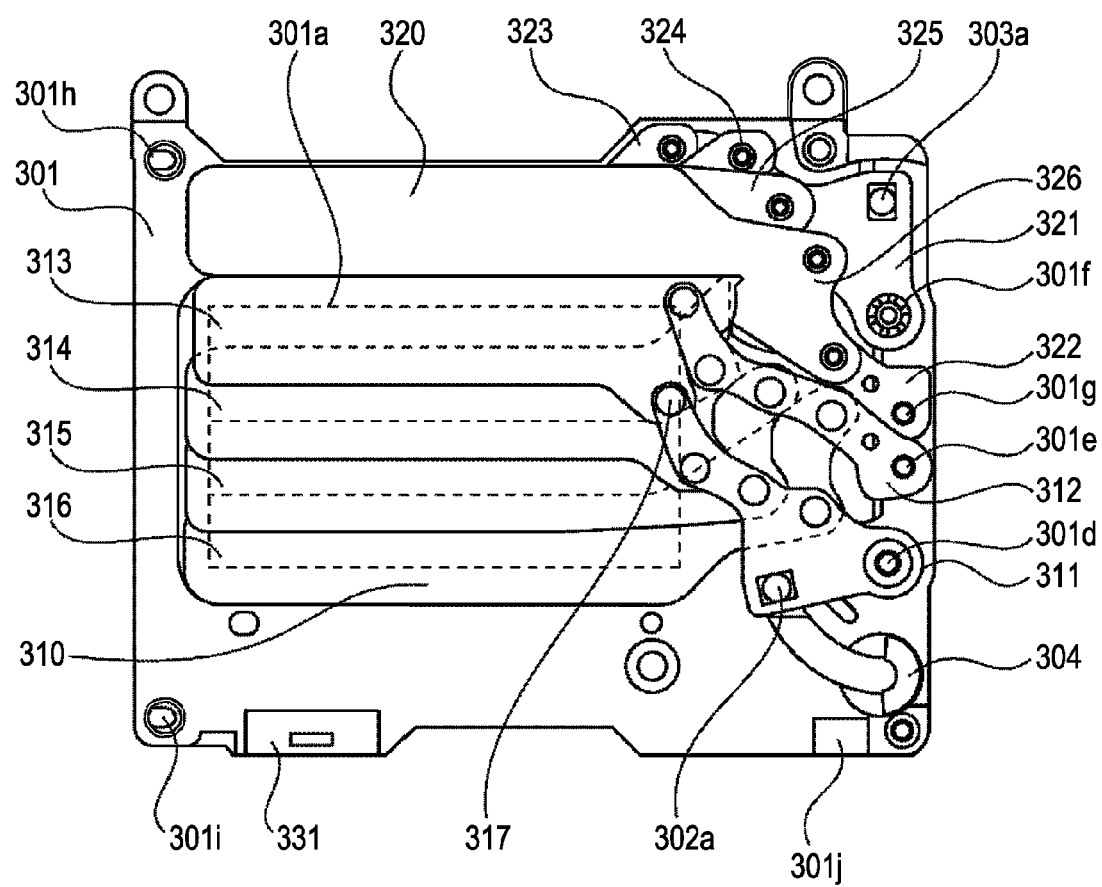
FIG. 7 is a rear view showing the focal-plane shutter unit before traveling according to the embodiment of the present invention.
Figure 8:
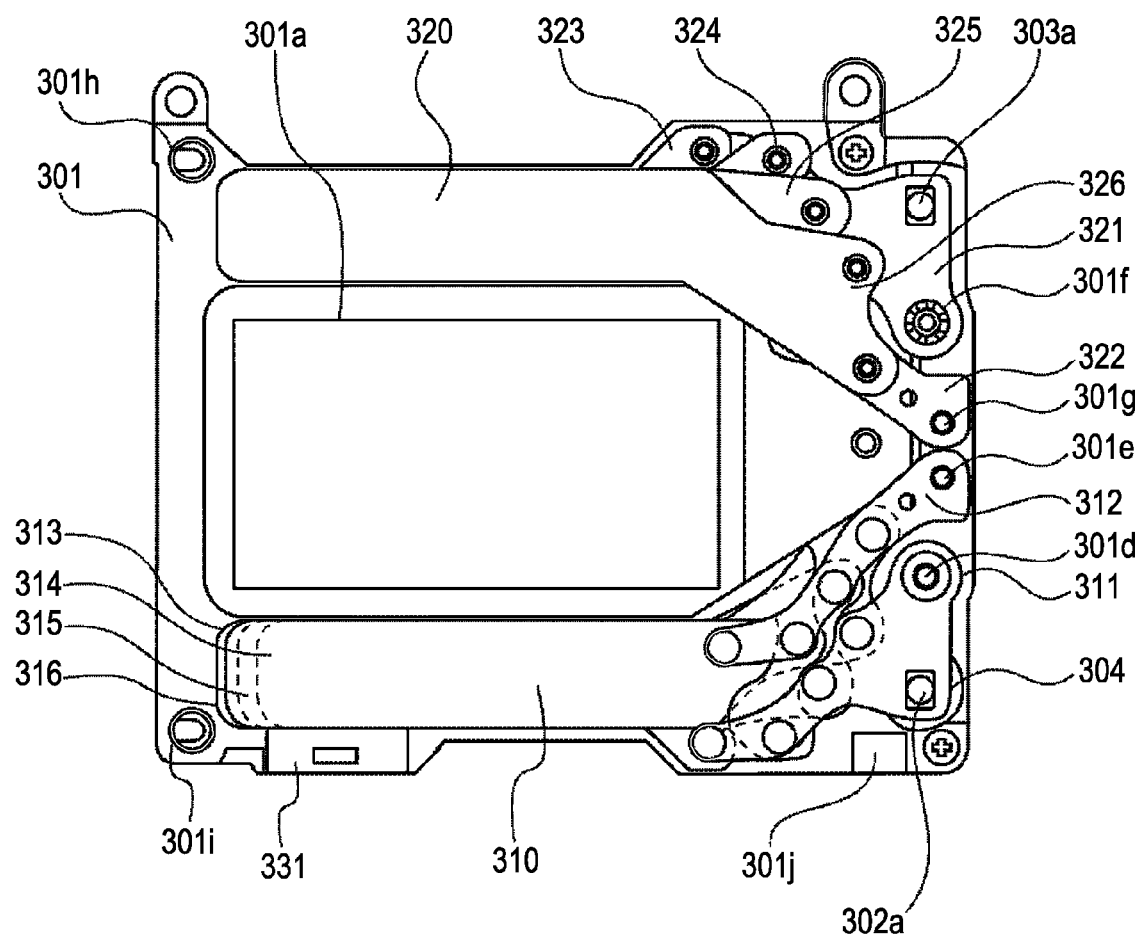
FIG. 8 is a rear view showing the focal-plane shutter unit when traveling of a first blade group is completed according to the embodiment of the present invention.
Figure 9:
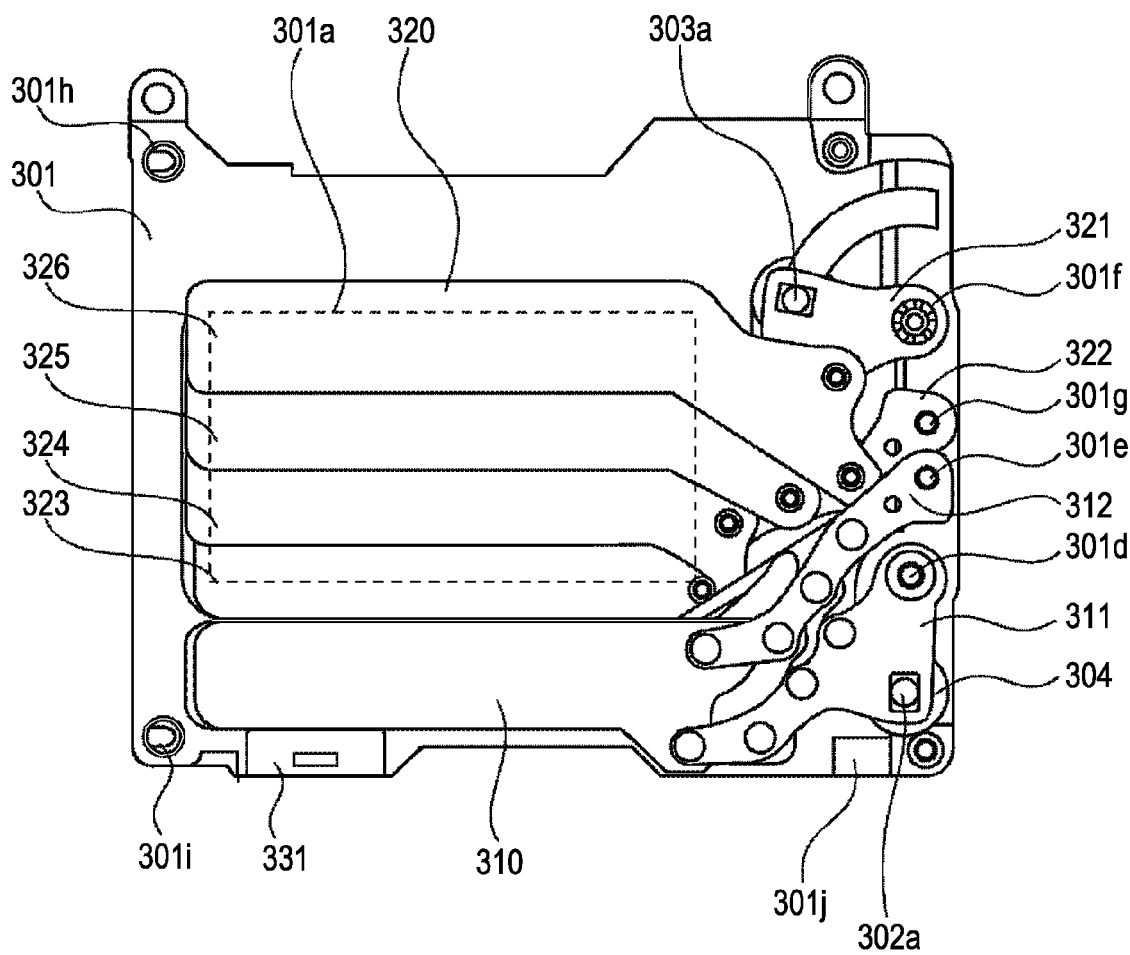
FIG. 9 is a rear view showing the focal-plane shutter unit when traveling of a second blade group is completed according to the embodiment of the present invention.
Figure 10:
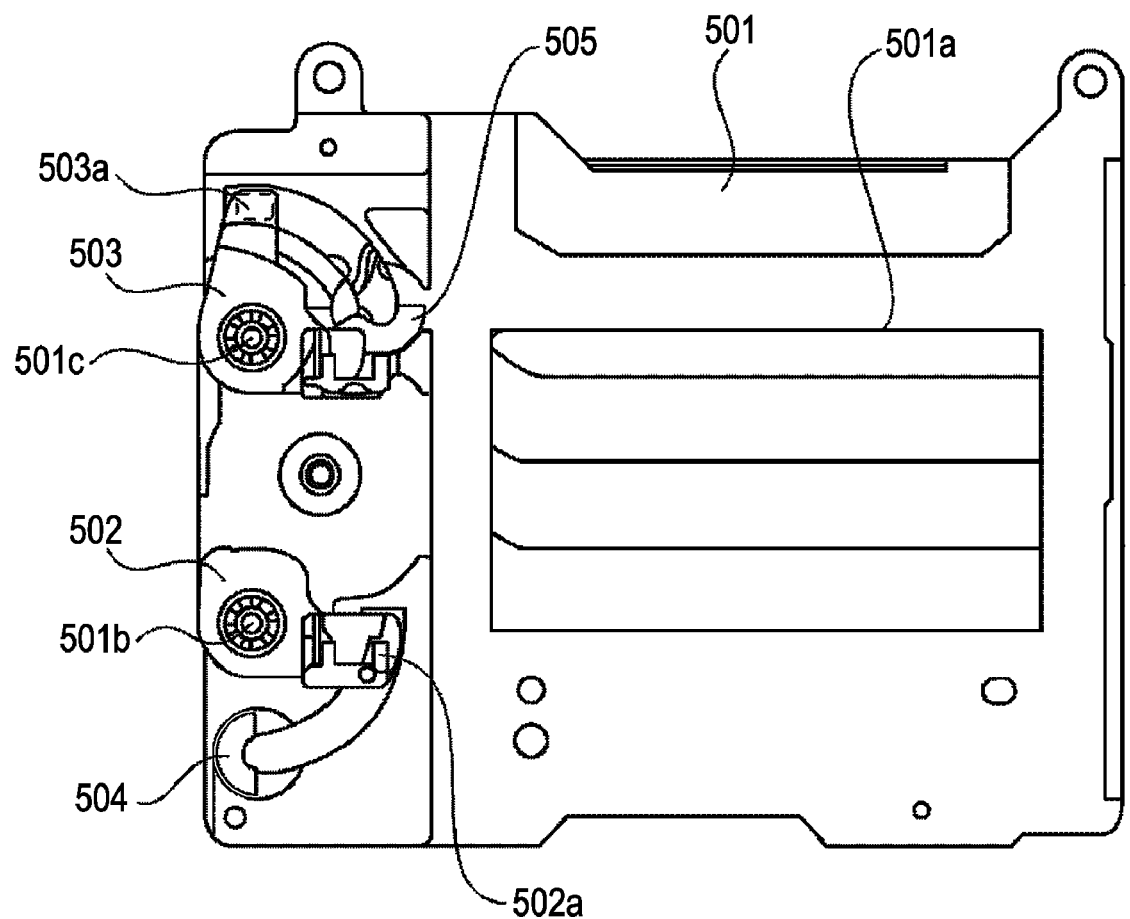
FIG. 10 is a front view showing a focal-plane shutter before traveling according to related art.
Figure 11:
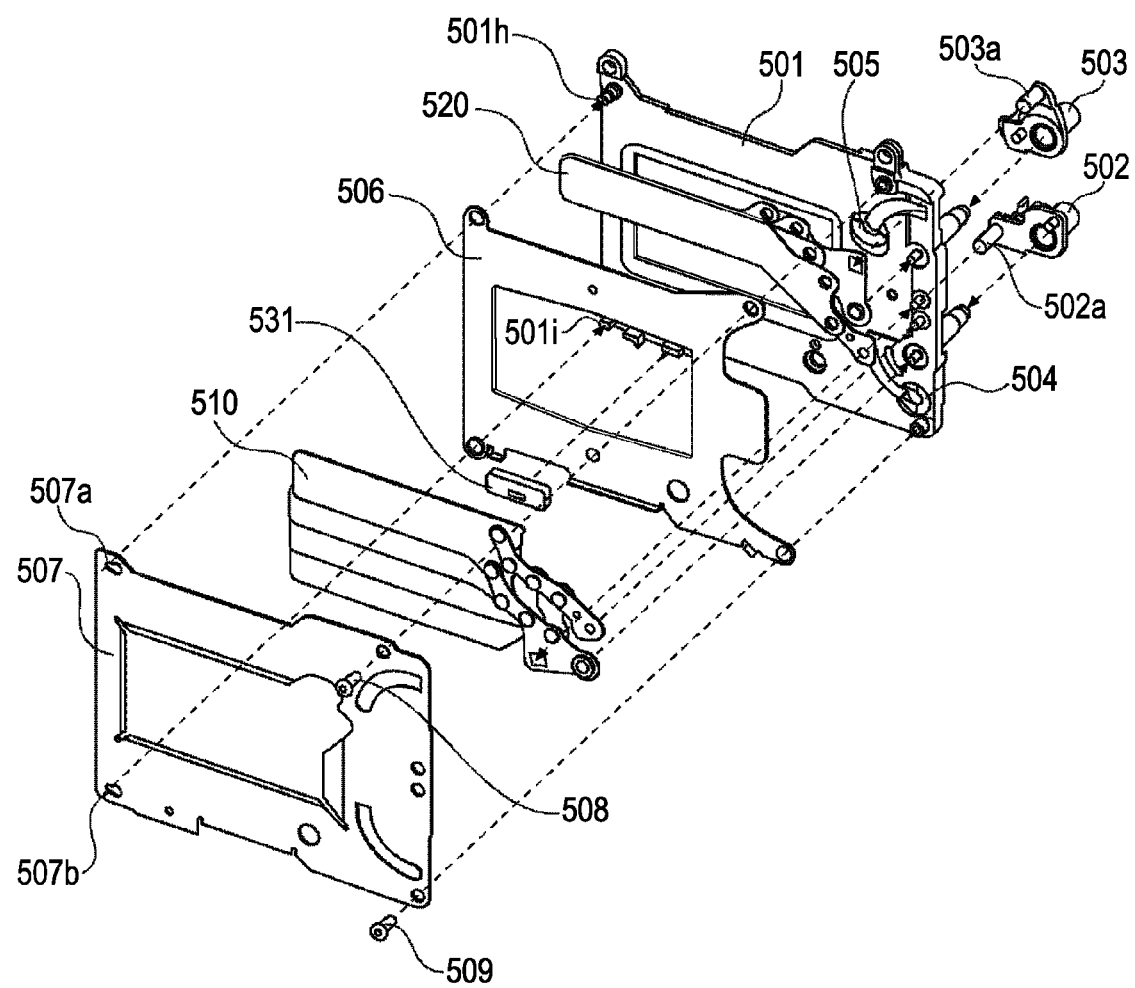
FIG. 11 is an exploded perspective view showing the focal-plane shutter of the related art when seen from the obliquely rear side of an opening portion.
Figure 12:
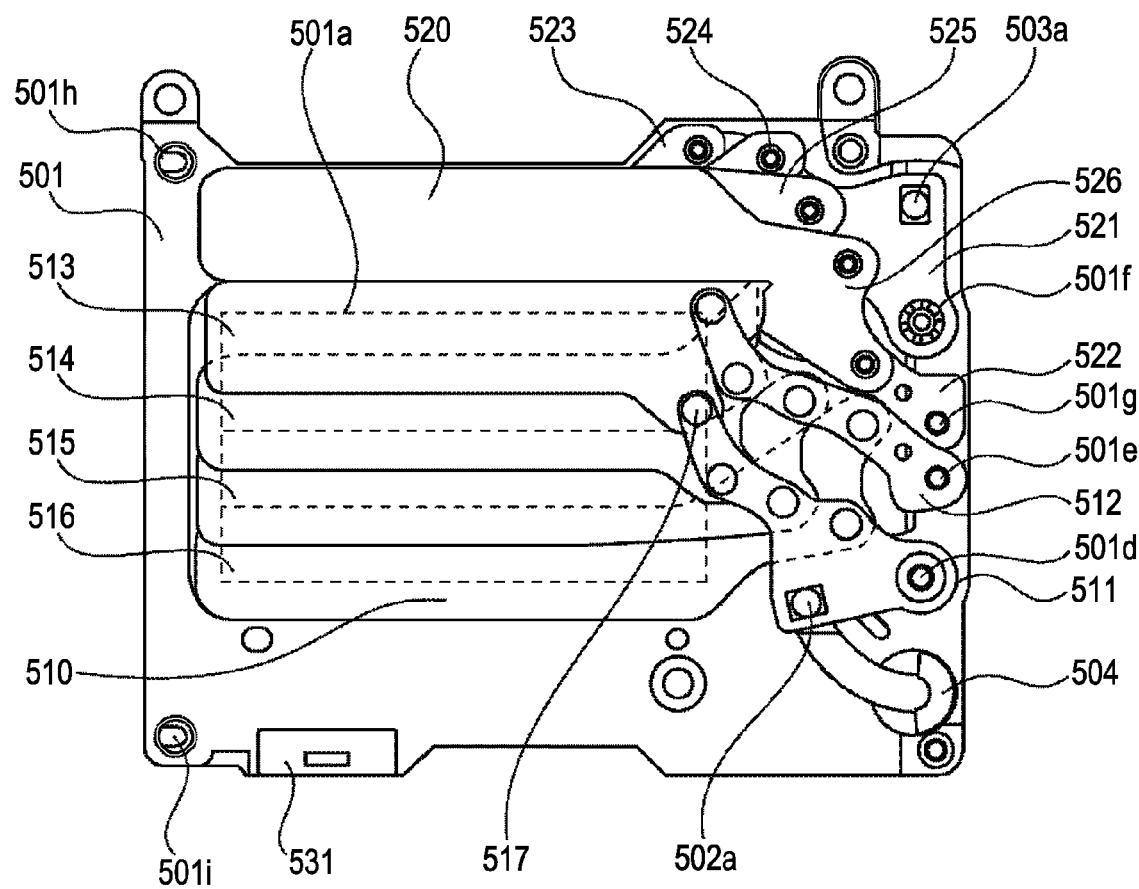
FIG. 12 is a rear view showing the focal-plane shutter before traveling according to the related art.
Figure 13:
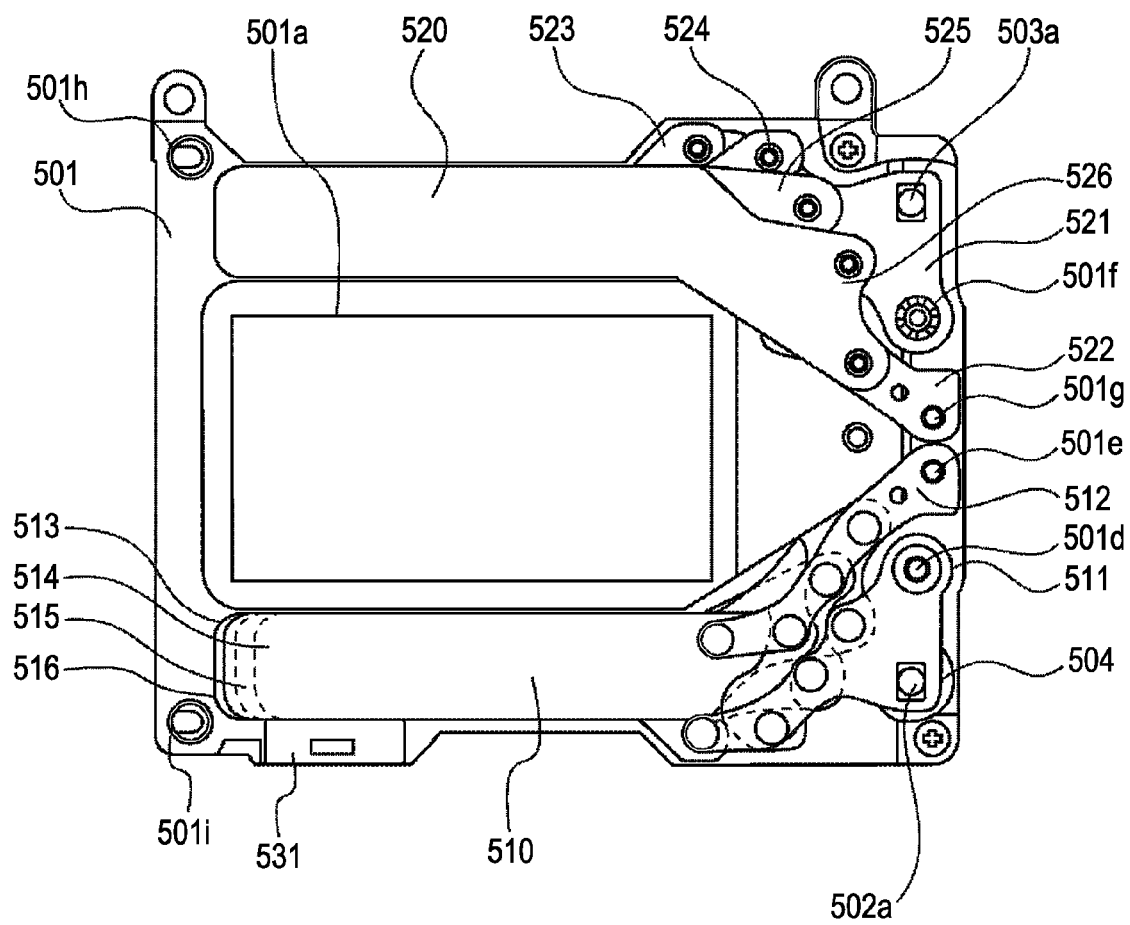
FIG. 13 is a rear view showing the focal-plane shutter when a first blade group thereof is in a travel completed state according to the related art.
Figure 14:
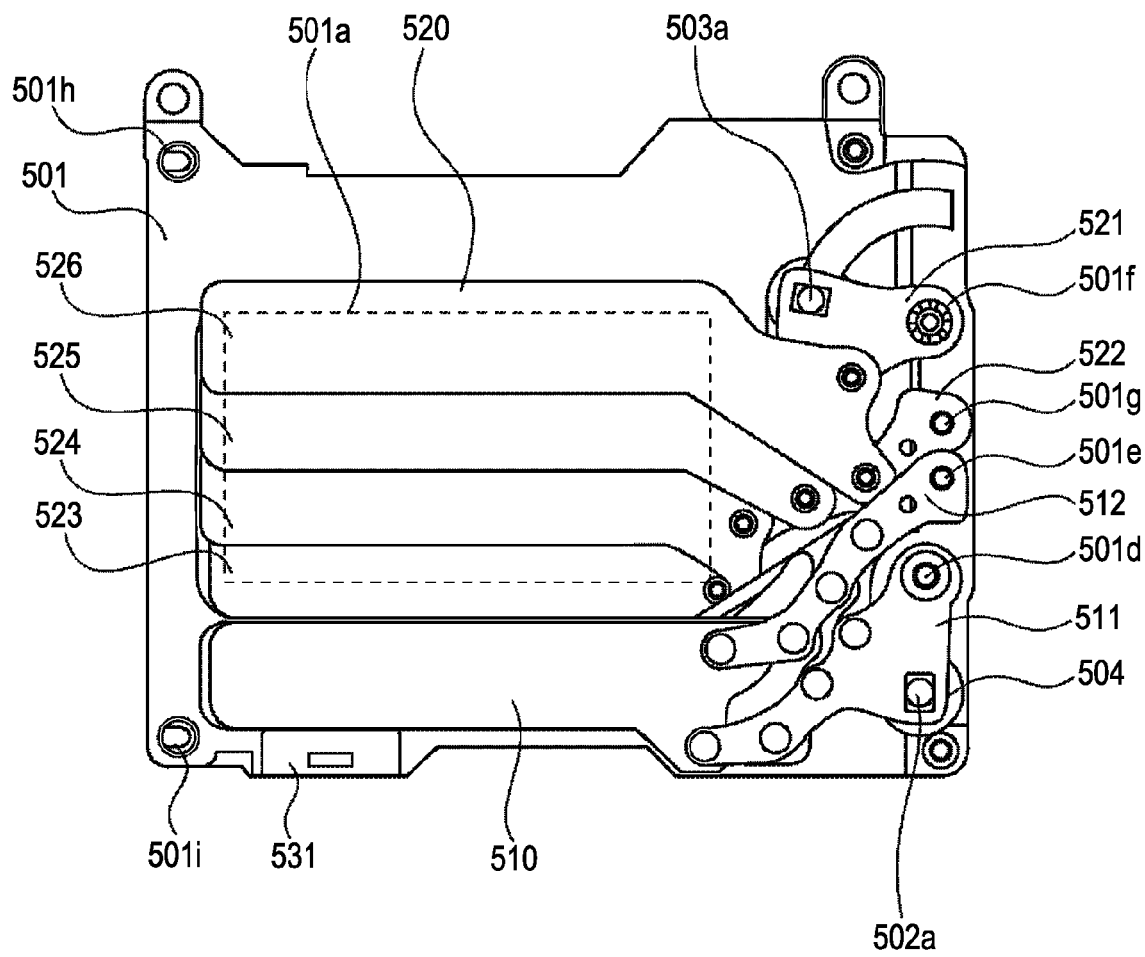
FIG. 14 is a rear view showing the focal-plane shutter when traveling of a second blade group is completed according to the related art.

FIGS. 7, 8, and 9 are rear views of the focal-plane shutter unit 32 according to the embodiment of the present invention. FIG. 7 illustrates a before-travel state of the first blade group 310, FIG. 8 illustrates a travel completed state of the first blade group 310, and FIG. 9 illustrates a travel completed state of the second blade group 320. For easier understanding, a partition plate 306 and the cover plate 307 are not illustrated.

The shutter base plate 301 includes a first protrusion 301j arranged near a travel completed position of the first blade group 310 and near a cover plate fastening screw. The first protrusion 301j has a predetermined thickness and a predetermined height. With the height, a sufficient traveling space is provided for the second blade group 320. The shutter base plate 301 includes a pin 301h, which goes through a hole of the partition plate 306 and goes through a hole 307a of the cover plate 307.

The cover plate 307 has a second protrusion 307c at a position corresponding to the position of the first protrusion 301j of the shutter base plate 301. The second protrusion 307c is arranged at a rectangular protruding part with a predetermined thickness, and has a semicircular protrusion.

The second protrusion 307c has a predetermined height. With the height, a sufficient traveling space is provided for the first blade group 310.

When the cover plate 307 is fixed to the shutter base plate 301 by cover plate fastening screws 308 and 309, the first protrusion 301j and the second protrusion 307c pinch the partition plate 306. Therefore the cover plate 307 is electrically connected to the partition plate 306 by the second protrusion 307c.

The first blade group 310, the second blade group 320, the partition plate 306, and the cover plate 307 are formed of a conductive material, or their surface are processed so as to have conductivity.

Referring to FIG. 5, when the cover plate 307 is fixed to the shutter base plate 301 by the cover plate fastening screw 309, a lead wire 340 is also fixed. The lead wire 340 is electrically connected to a ground potential portion of the camera body 1 (not shown), so that the cover plate 307 has a potential at the ground level.

It is to be noted that the lead wire 340 for grounding may be omitted, and a similar advantage can be attained if the shutter base plate 301 grounded to the camera body 1 is formed of a conductive material.

With such a configuration, the following advantage can be attained.

Since the cover plate 307 of the focal-plane shutter unit 32 is connected to the ground potential portion of the camera body 1, the partition plate 306 is also connected to the ground potential portion.

Thus, the first blade group 310 contacting the cover plate 307, and the partition plate 306 pinched between the cover plate 307 and the shutter base plate 301 are connected to the ground potential portion.

This is because the first blade group 310, the partition plate 306, and the cover plate 307 are formed of a conductive material, or their surfaces are processed so as to have conductivity.

Accordingly, when the first blade group 310 travels from a deployed state to a superposed state, or from the superposed state to a travel standby state under the control of the shutter drive circuit 103, static electricity is not produced even if friction or contact occurs in the shutter device.

In particular, even if friction or contact occurs between blades of the first blade group 310, between the first blade group 310 and the cover plate 307, or between the first blade group 310 and the partition plate 306, a generated charge immediately flows to the ground potential portion of the camera body 1 through the cover plate 307 because of the conductivity of the first blade group 310, and hence static electricity is not charged.

As described above, with the configuration of this embodiment, charging and discharging of static electricity due to the operation of the first blade group 310 does not occur. Thus, a noise component can be prevented from being produced as a result of discharging of static electricity, which may adversely affect an image.

Figure 15A:
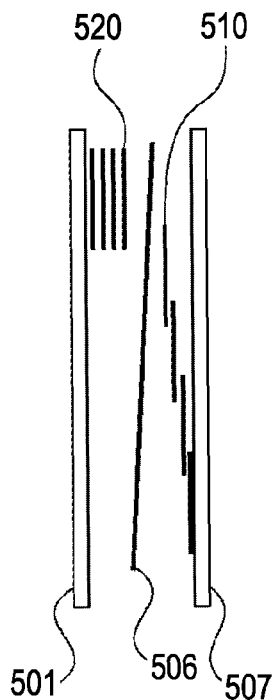
FIGS. 15A to 15D are conceptual diagrams showing a mechanism in which static electricity is charged due to the operation of the focal-plane shutter according to the related art.
Figure 15B:
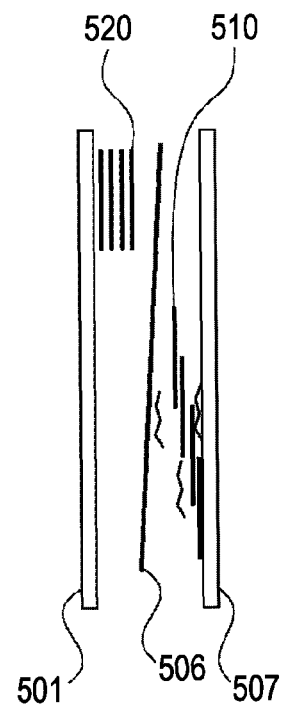
Figure 15C:
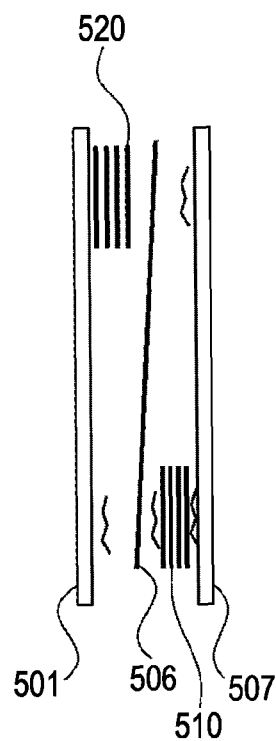
Figure 15D:
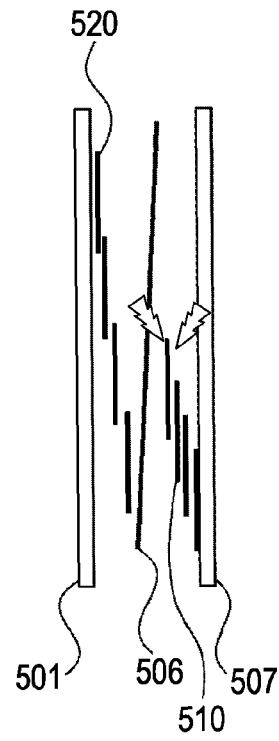

In the second blade group 320, a second blade 323 which covers an aperture 301a first among four blades of the second blade group 320 contacts the partition plate 306 when traveling of the second blade group 320 is completed as shown in FIG. 15D. Accordingly, the second blade group 320 is connected to the ground potential portion of the camera body 1 via the cover plate 307.

This is because the second blade group 320 is also formed of a conductive material, or the surface is processed so as to have conductivity. Accordingly, when the first blade group 310 travels from the superposed state to the deployed state (travel standby state), since the second blade group 320 and the first blade group 310 have the same potential at the ground level, a potential difference is not produced, and discharging does not occur. That is, a noise component can be prevented from being produced due to discharging, which may adversely affect an image.

In the embodiment of the present invention, since the cover plate 307 has the potential at the ground level, at least one of the first blade group 310 and the second blade group 320 contacting the cover plate 307, and the partition plate 306 have the potential at the ground level, thereby preventing charging of static electricity.

In this embodiment, the partition plate 306 is pinched at the position near the cover plate fastening screw 309. With this configuration, even if deformation, such as warping, appears at the partition plate 306 when the partition plate 306 is pinched by the first protrusion 301j and the second protrusion 307c, the deformation appears at a position in which traveling of the first blade group 310 and the second blade group 320 is completed. The influence of the deformation to the shutter operation is negligible.

Also, since the shutter base plate 301 and the cover plate 307 respectively have the first protrusion 301j and the second protrusion 307c having predetermined heights, the traveling spaces of the first blade group 310 and the second blade group 320 are provided. Accordingly, friction during traveling does not rapidly increase, and hence, the accuracy of the shutter operation is not deteriorated.

Further, since the partition plate 306 is pinched at the position near the cover plate fastening screw 309 at the lower portion, the cover plate 307 is not lifted up, but reliably contacts the partition plate 306.

It is to be noted that the shapes of the shutter base plate 301 and the cover plate 307 are not limited to those shapes described in the above embodiment. The above embodiment provides merely example shapes.

Also, while the shape of the second protrusion 307c is a protruding shape in the above-described embodiment, the shape is not limited thereto, and may be any shape as long as the partition plate can be pinched by first and second protrusions.

Also, while the lead wire 340 is fixed to the cover plate fastening screw 309 of the cover plate 307 and is connected to the potential portion at the ground level of the camera body 1 in the above-described embodiment, it is not limited thereto.

For example, the length of the cover plate fastening screw 309 may be increased and connected to a substrate of the camera body 1 or the potential portion at the ground level by screwing.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-071598 filed Mar. 19, 2008, which is hereby incorporated by reference herein in its entirety.

What is claimed is:

1. A shutter device comprising:
a first shutter blade having conductivity;
a second shutter blade having conductivity;
a shutter base plate rotatably supporting the first and second shutter blades;
a partition plate arranged between the first and second shutter blades supported by the shutter base plate, the partition plate having conductivity; and
a cover plate fixed to the shutter base plate while the first and second shutter blades are supported by the shutter base plate and the partition plate is arranged between the first and second shutter blades, the cover plate having conductivity, the cover plate electrically connected to the partition plate, the cover plate having a potential at a ground level,
wherein the shutter base plate includes a first protrusion and the cover plate includes a second protrusion, the partition plate pinched between the first and second protrusions.

2. The shutter device according to claim 1, wherein the cover plate is fastened to the shutter base plate by a screw, the first protrusion is provided near a fastening position of the shutter base plate, and the second protrusion is provided near a fastening position of the cover plate.

3. A shutter device comprising:
a shutter blade having conductivity;
a shutter base plate rotatably supporting the shutter blade;
a partition plate configured to contact one side of the shutter blade supported by the shutter base plate, the partition plate having conductivity; and
a cover plate fixed to the shutter base plate while the cover plate contacts the other side of the shutter blade supported by the shutter base plate, the cover plate having conductivity, the cover plate electrically connected to the partition plate, the cover plate having a potential at a ground level,
wherein the shutter base plate includes a first protrusion and the cover plate includes a second protrusion, the partition plate pinched between the first and second protrusions.

4. An image pickup apparatus comprising:
a shutter device, the shutter device including,
a first shutter blade having conductivity;
a second shutter blade having conductivity;
a shutter base plate rotatably supporting the first and second shutter blades;
a partition plate arranged between the first and second shutter blades supported by the shutter base plate, the partition plate having conductivity;
a cover plate fixed to the shutter base plate while the first and second shutter blades are supported by the shutter base plate and the partition plate is arranged between the first and second shutter blades, the cover plate having conductivity, the cover plate electrically connected to the partition plate, the cover plate having a potential at a ground level,
wherein the shutter base plate includes a first protrusion and the cover plate includes a second protrusion, the partition plate pinched between the first and second protrusions.

5. The image pickup apparatus according to claim 4, wherein the cover plate is fastened to the shutter base plate by a screw, the first protrusion is provided near a fastening position of the shutter base plate, and the second protrusion is provided near a fastening position of the cover plate.

6. An image pickup apparatus comprising:
a shutter device, the shutter device including,
a shutter blade having conductivity;
a shutter base plate rotatably supporting the shutter blade;
a partition plate configured to contact one side of the shutter blade supported by the shutter base plate, the partition plate having conductivity; and
a cover plate fixed to the shutter base plate while the cover plate contacts the other side of the shutter blade supported by the shutter base plate, the cover plate having conductivity, the cover plate electrically connected to the partition plate, the cover plate having a potential at a ground level,
wherein the shutter base plate includes a first protrusion and the cover plate includes a second protrusion, the partition plate pinched between the first and second protrusions.

* * * * *